Figure 1:
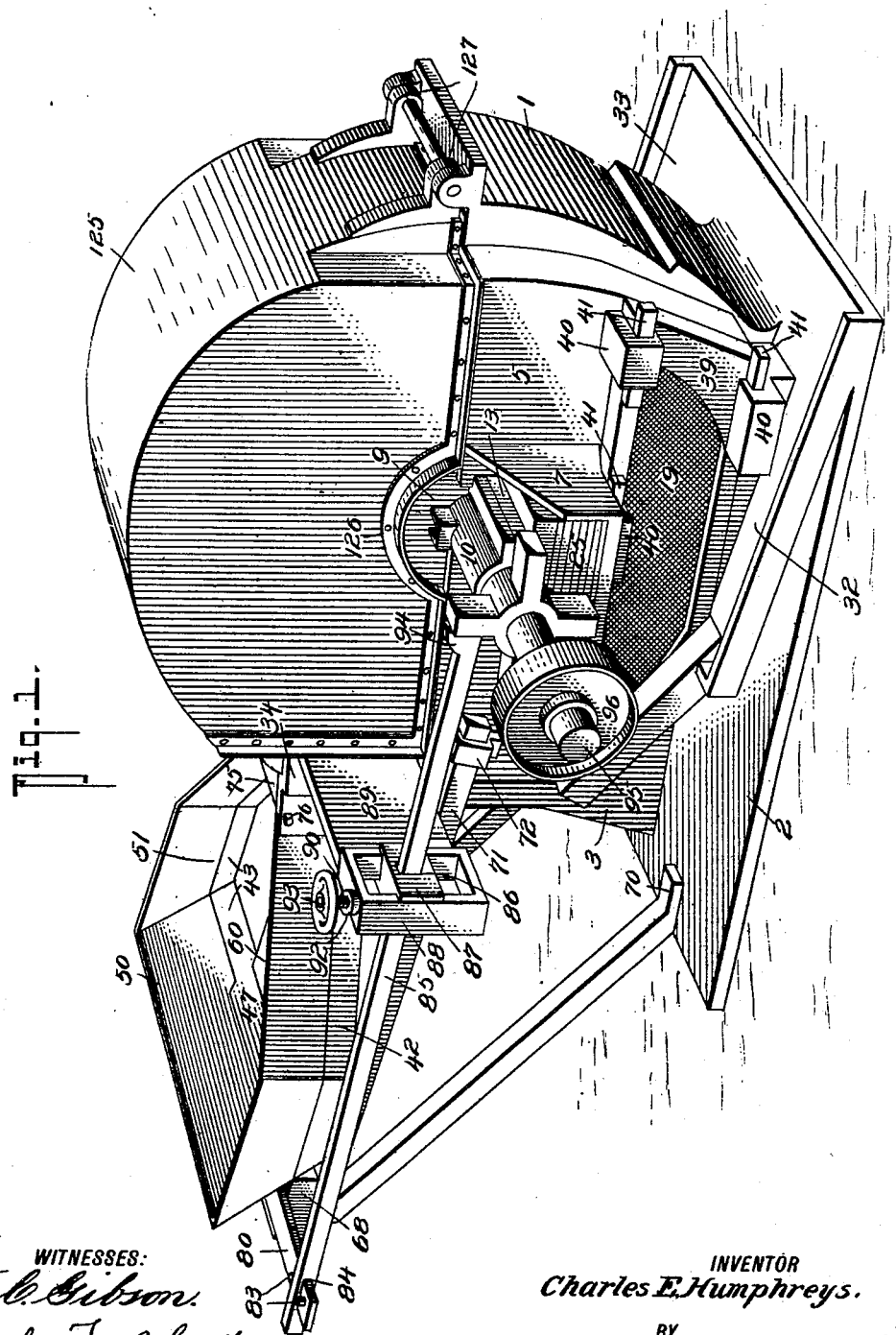

No. 860,747. PATENTED JULY 23, 1907.
C. E. HUMPHREYS.
QUARTZ MILL.
APPLICATION FILED DEC. 27, 1905.

7 SHEETS—SHEET 1.

WITNESSES:
F. C. Gibson.
John T. Schrott.

INVENTOR
Charles E. Humphreys.
BY
Fred G. Dieterich & Co.
ATTORNEYS

No. 860,747. PATENTED JULY 23, 1907.
C. E. HUMPHREYS.
QUARTZ MILL.
APPLICATION FILED DEC. 27, 1905.

7 SHEETS—SHEET 5.

WITNESSES:
F. C. Gibson.
John J. Schrott.

INVENTOR
Charles E. Humphreys
BY
Fred G. Dieterich &Co.
ATTORNEYS

No. 860,747. PATENTED JULY 23, 1907.
C. E. HUMPHREYS.
QUARTZ MILL.
APPLICATION FILED DEC. 27, 1905.
7 SHEETS—SHEET 6.
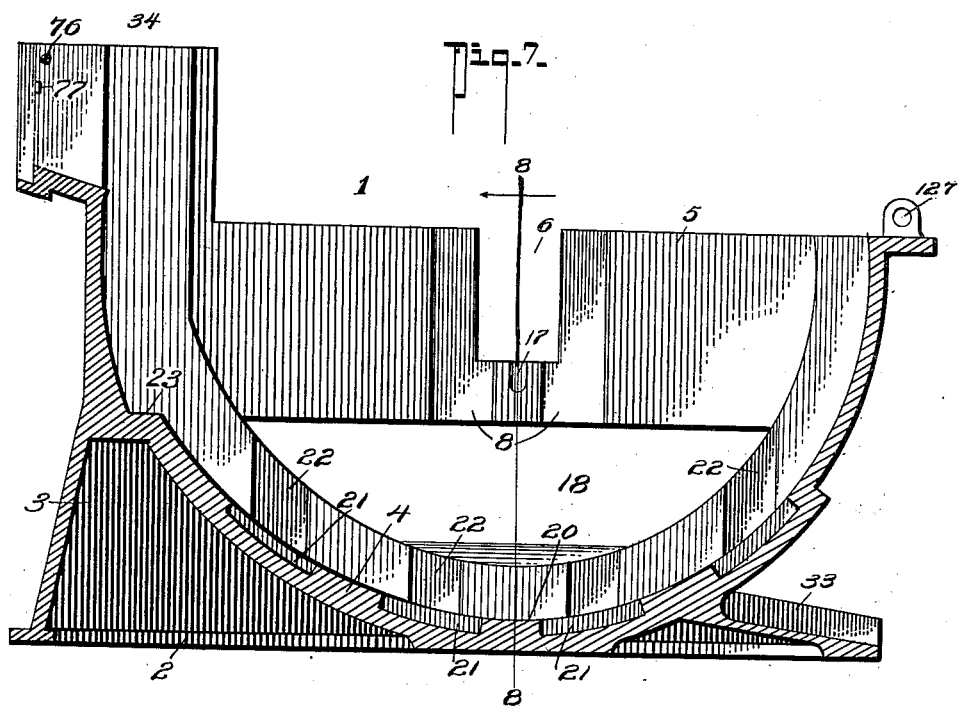
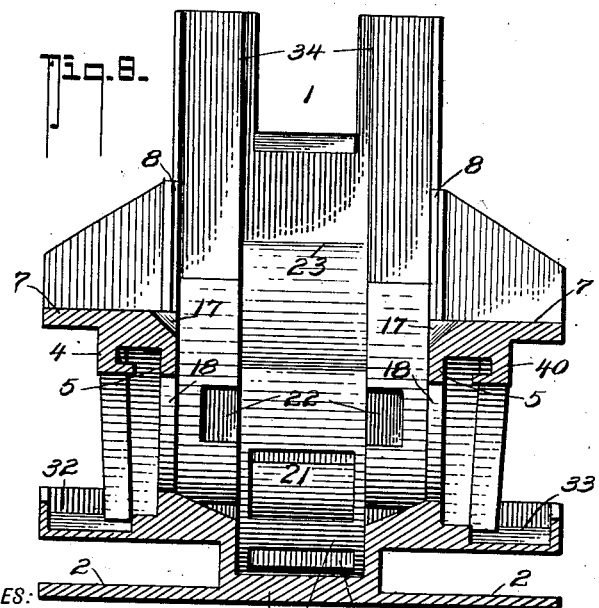
WITNESSES:
F. C. Gibson
John T. Schrott
INVENTOR
Charles E. Humphreys.
BY
Fred G. Dieterich
ATTORNEYS No. 860,747. PATENTED JULY 23, 1907.
C. E. HUMPHREYS.
QUARTZ MILL.
APPLICATION FILED DEC. 27, 1905.
7 SHEETS—SHEET 7.
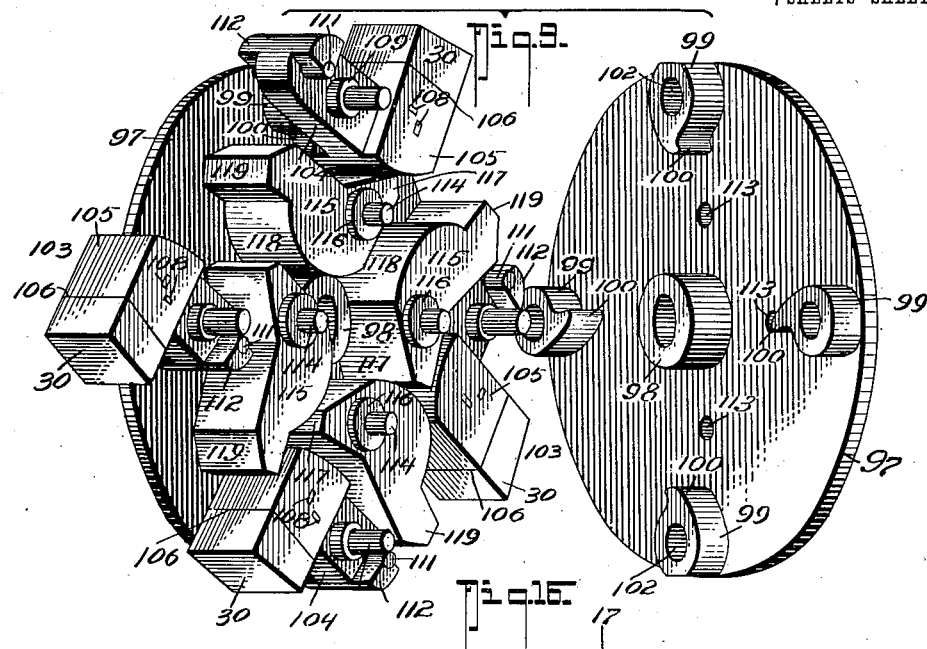
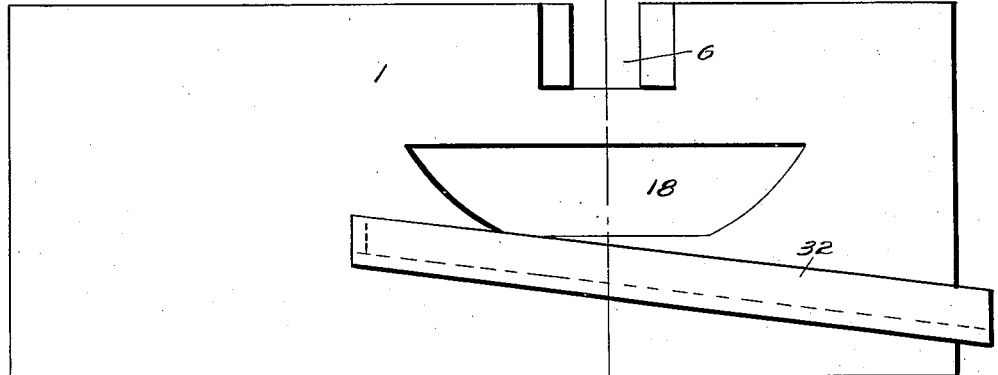
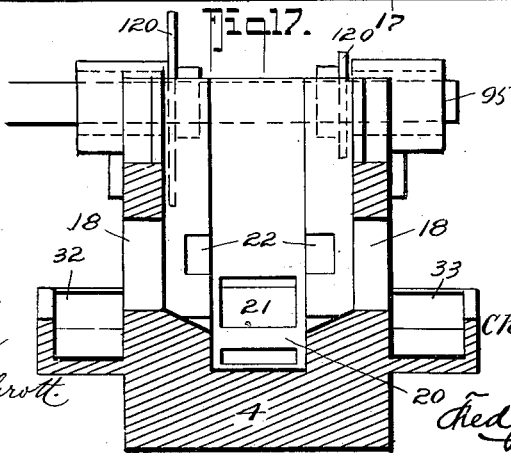
WITNESSES:
INVENTOR
Charles E. Humphreys.
BY
Fred G. Dieterich & Co.
ATTORNEYS

UNITED STATES PATENT OFFICE.

CHARLES E. HUMPHREYS, OF WALKER, CALIFORNIA.

QUARTZ-MILL.

No. 860,747.      Specification of Letters Patent.      Patented July 23, 1907.

Application filed December 27, 1905. Serial No. 293,497.

*To all whom it may concern:*

Be it known that I, CHARLES E. HUMPHREYS, residing at Walker, in the county of Siskiyou and State of California, have invented certain new and useful Improvements in Quartz-Mills, of which the following is a specification.

My invention relates to certain new and useful improvements in quartz mills and the like, and it particularly relates to improvements in grinding and crushing mills of the rotary type.

Primarily, my invention has for its object to provide a mill of a simple and effective construction which is particularly adapted for the reduction of gold bearing ores and which will be effective and economical in its operation.

Again, my invention has for its object to provide a mill of this character embodying the essential crushing characteristics of a stamp mill and the pulverizing and grinding features of an arrastre, differing from the latter, in that my mill is disposed vertically while the arrastre is disposed horizontally.

Generically, my invention includes certain new and useful improvements on the improvement disclosed in my Patent No. 769610, of September 6, 1904.

In its more detailed nature, my invention includes improved hammer devices and improved means coöperating with the hammers for causing them to perform a uniform grinding or pulverizing action on the material during their entire active movement.

The invention also includes an improved form of feeding mechanism for feeding the material to the crusher anvil and an improved means for adjusting such feeding means.

Again, my invention includes means coöperating with the journal of the main shaft whereby the shaft can be so adjusted as to insure the proper distance between the dies and the grinding shoe at all times to allow for wear on the shoes.

In this invention I also provide improved pockets on each side of the die of the mortar for receiving amalgam and means carried by the die for fitting in the amalgam pockets to hold the die stationary.

My present invention also includes improvements in the boxes whereby the feed water is equally distributed in the mill and also keeps any grit washed clean of the bearings.

With other objects in view than have been heretofore specified, my invention also includes certain novel construction, combination and arrangement of parts, all of which will be first described in detail and then be specifically pointed out in the appended claims, reference being had to the accompanying drawings, in which:—

Figure 2:
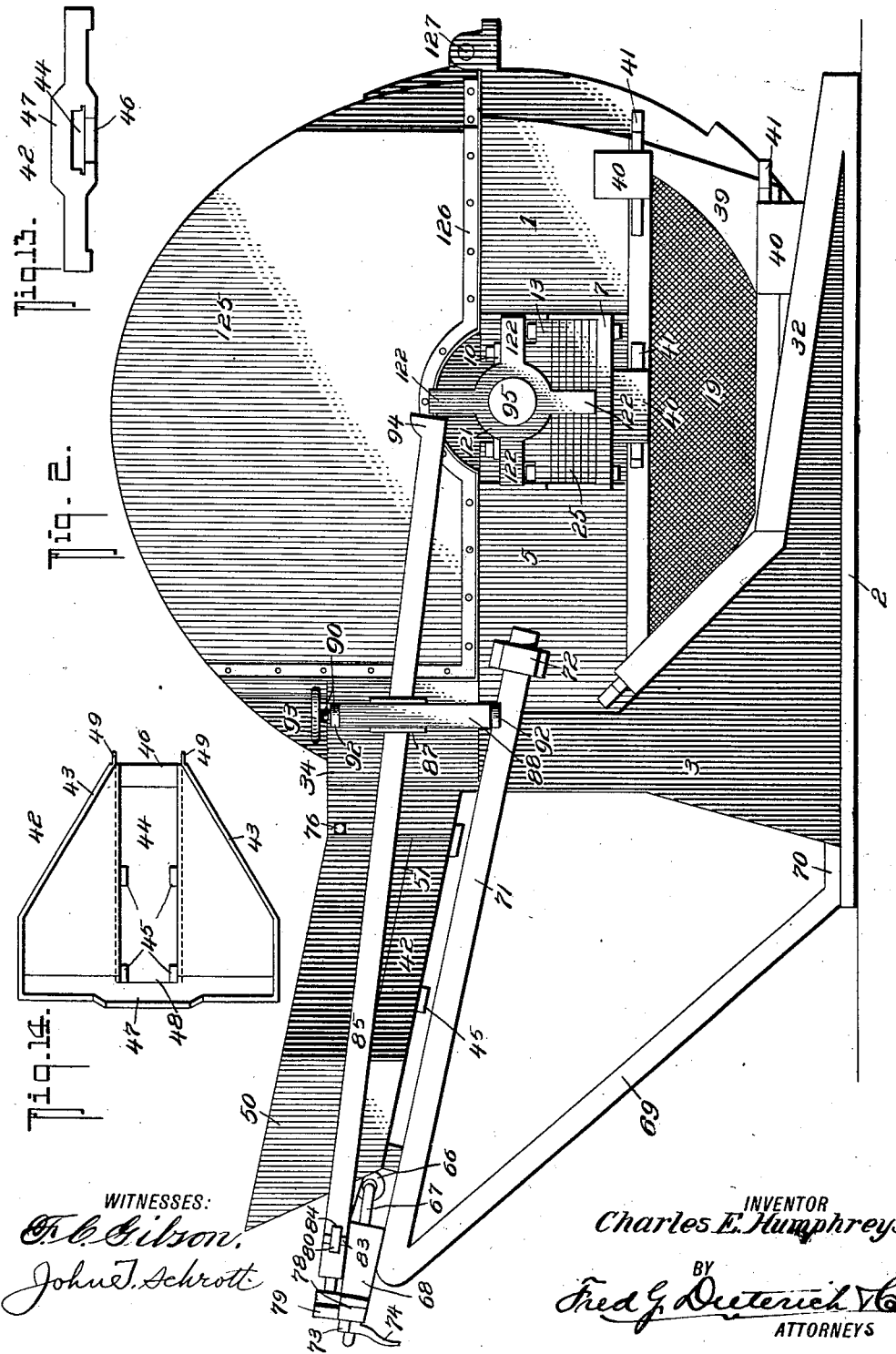
Figure 3:
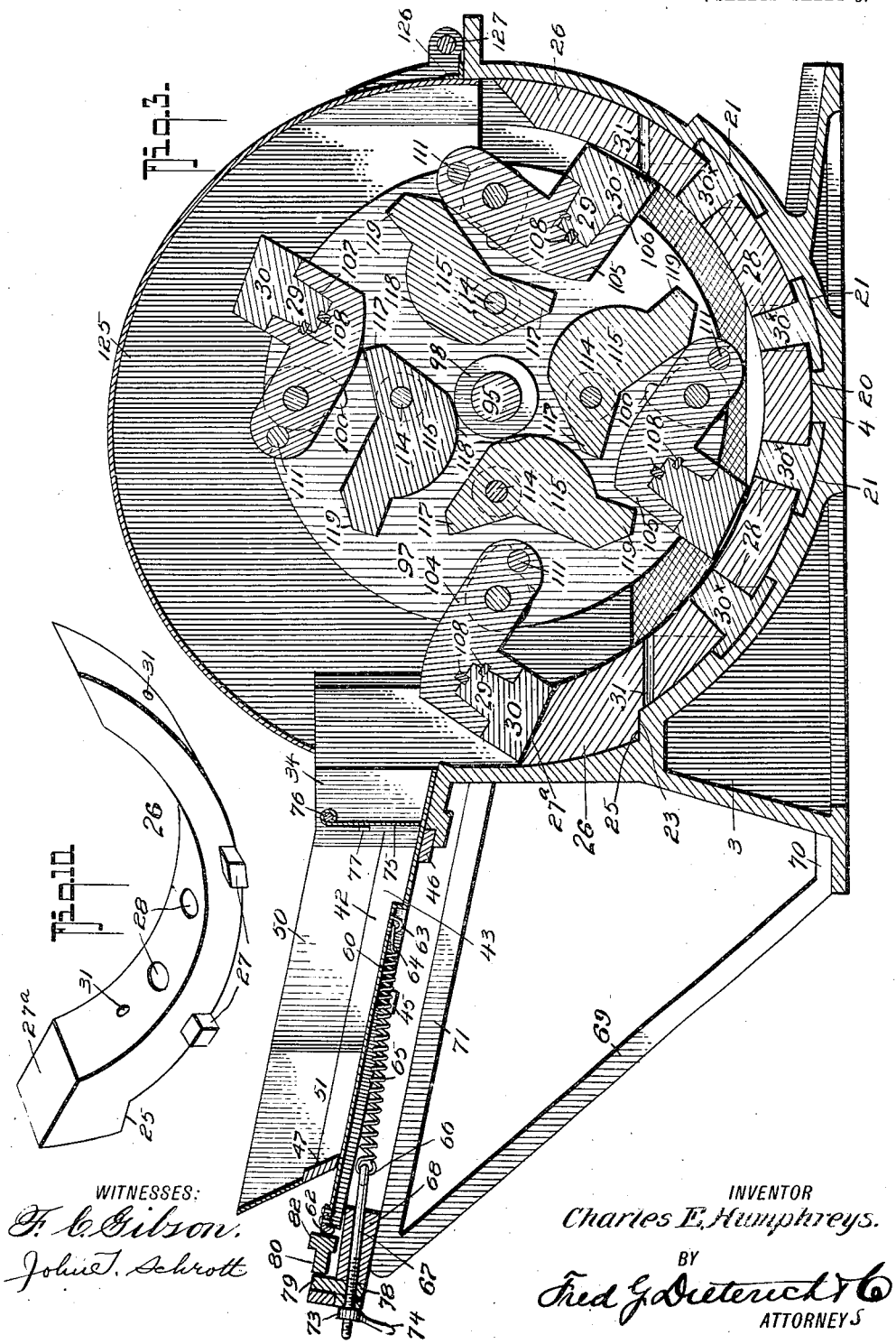
Figure 4:
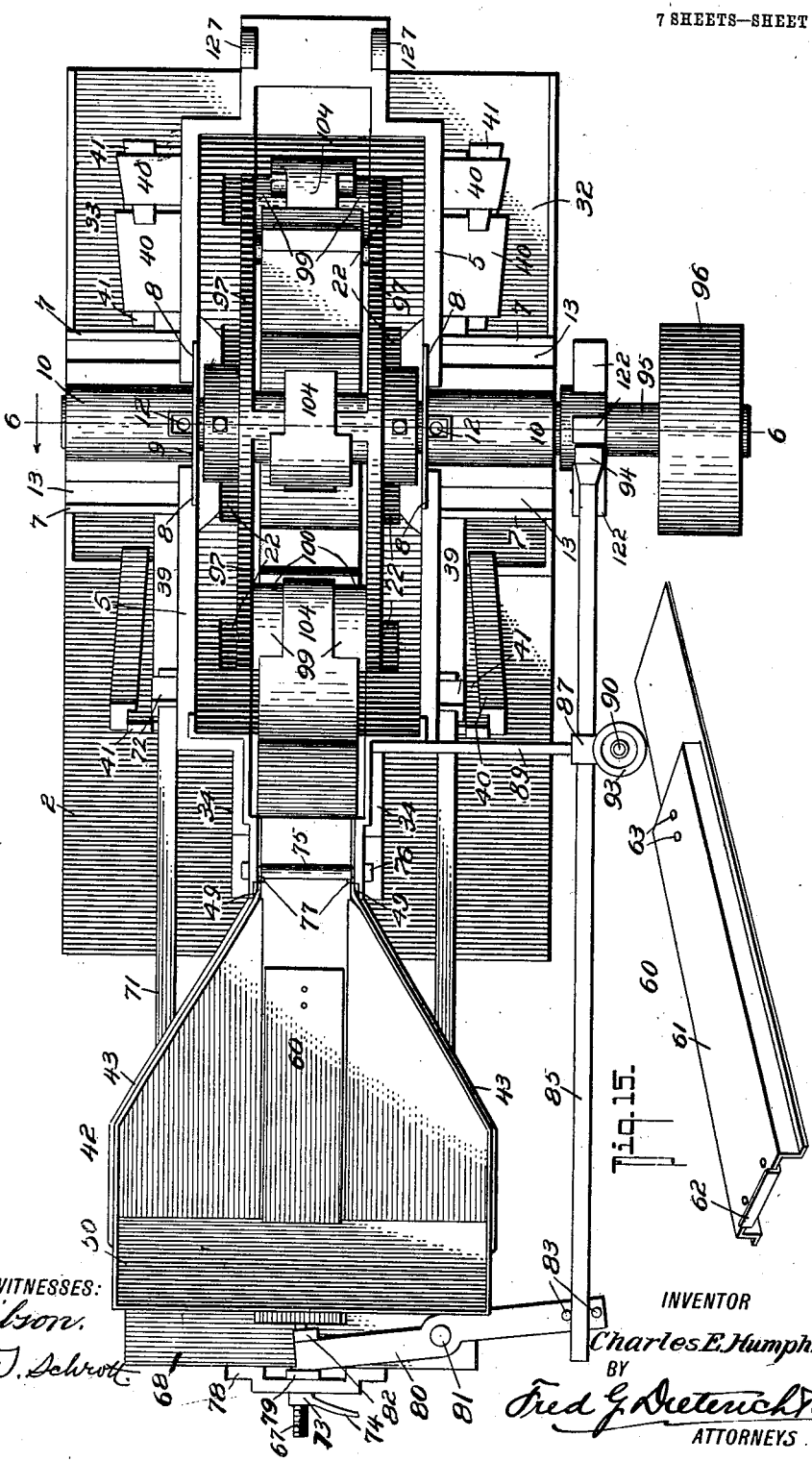
Figure 5:
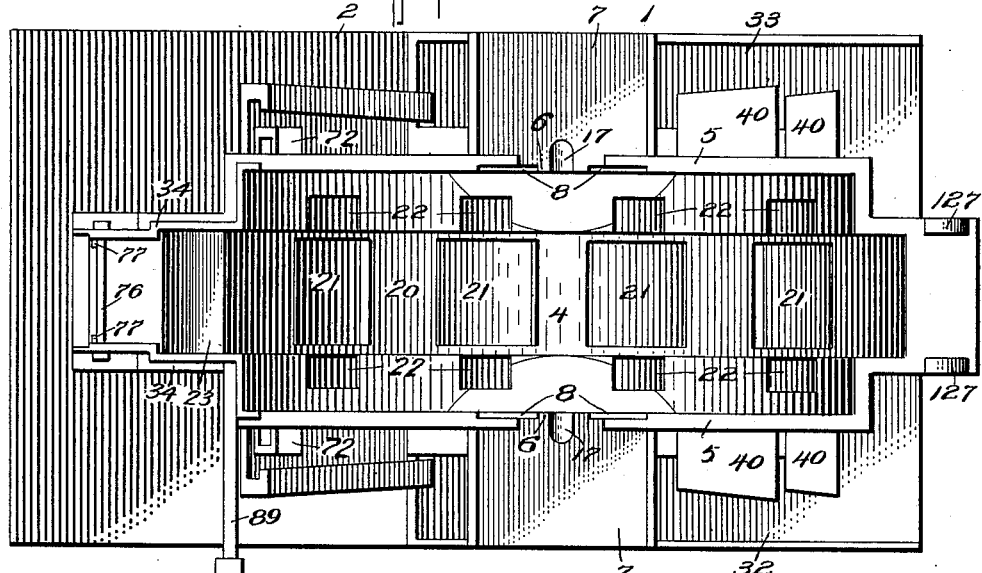
Figure 11:
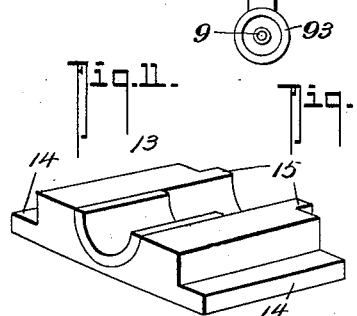
Figure 6:
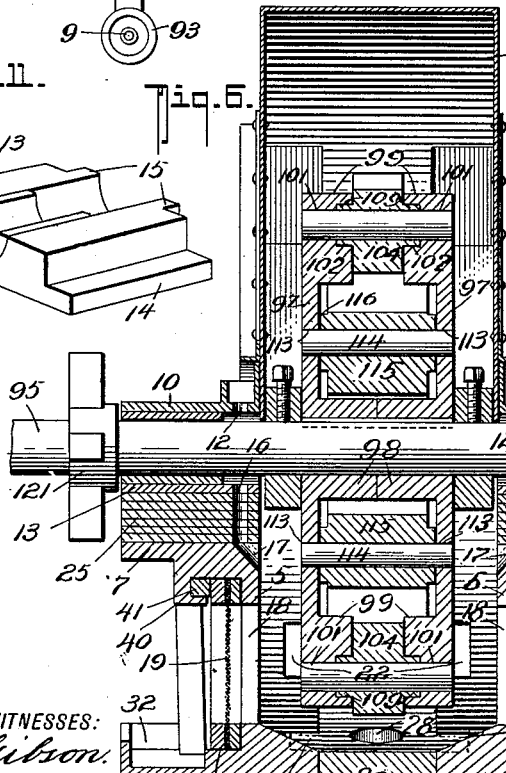
Figure 12:
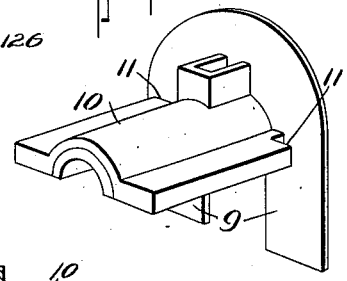

Figure 1, is a perspective view showing my invention complete. Fig. 2, is a side elevation thereof. Fig. 3, is a central vertical longitudinal section of my invention. Fig. 4, is a top plan view of my invention, the housing being removed. Fig. 5, is a top plan view of my invention, the crushing and grinding mechanism being removed and showing the mortar in plan view. Fig. 6, is a cross section on the line 6—6 of Fig. 4, looking in the direction of the arrow. Fig. 7, is a central longitudinal section of the mortar. Fig. 8, is a cross section thereof on the line 8—8 of Fig. 7. Fig. 9, is a perspective view of the hammer carrying mechanism, one of the hammer carrying disks being shown detached. Fig. 10, is a detail perspective view of the die. Fig. 11, is a detail perspective view of one of the bottom bearing boxes. Fig. 12, is a similar view of one of the top bearing boxes. Figs. 13 and 14, are respectively, an end elevation and a plan view of the feed trough. Fig. 15, is a detail view of the reciprocating feed plate. Fig. 16, is a detail side elevation of a modified form of mortar showing the design of the same when constructed of a single piece of timber, and is used in lieu of the mortar shown in the remaining figures, which is the form of mortar when the same is to be formed of metal. Fig. 17, is a cross section on the line 17—17 of Fig. 16.

Referring now to the accompanying drawings in which like numerals and letters of reference indicate like parts in all of the figures, 1 designates the mortar which has a supporting base 2 and supporting webs 3 formed integrally, the mortar 1 including a bottom 4 curved in a circular arc for a purpose presently understood.

The sides 5 of the mortar have bearing-slots 6 and brackets 7 which latter project from the sides of the mortar to support the bearings for the drive shaft hereinafter again referred to. The sides 5 of the mortar have grooves or countersunk portions 8 into which the flanges 9 of the upper bearing boxes 10 fit and the bearing boxes 10 have their projecting portions 11 arranged to fit in the slots 6. The upper bearing box 10 has an aperture 12 for a purpose presently explained. The lower bearing boxes 13 each have bars 14 to rest in the brackets 7 and have projecting portions 15 to coöperate with the projecting portions 11 of the upper bearing boxes 10 and fit the slots 6, as shown, spacing plates 25 being provided beneath the bars 14 of the lower bearing boxes for a purpose presently understood. The lower bearing boxes 13 have apertures 16 which communicate with the grooves 17 on the inner faces of the mortar sides adjacent the slots 6. The sides 5 of the mortar have openings 18 normally covered by screens 19, as shown. The manner of supporting the screens will be presently explained.

The mortar bottom 4 has a central circular channel or depression 20 formed with a series of radial pockets 21 in its lower face to receive mercury or other suitable amalgamating material, while supplemental amalgam pockets 22 are provided on the sides of the channel 20 to coöperate with the pockets 21, as will be hereinafter more fully understood. The channel 20 has a shoulder 23 to abut the shoulder 25 of the die 26, which die 26, comprises a body portion formed in a circular arc to fit in the depression 20 of the mortar, and is provided with radial lugs 27—27 which fit in the end pockets 22 of the mortar. The die 26 has an anvil portion 27ª at its front end for a purpose presently to appear. The die 26 may be also provided with a plurality of radially disposed apertures 28 to receive the shanks 29 of the worn out hammer shoes 30× which fit into the pockets 21, when in position in the die 26, as indicated in Fig. 3. These worn out hammer shoes 30×, as shown in Fig. 3, form a fastening means between the die 26 and the mortar as shown and also enable a solid die to be obtained with a minimum amount of metal since the material of the worn out hammer shoes is used as plugs to fill the apertures 28 of the die 26. The die 26 is also provided with a pair of horizontal apertures 31 to receive a hook or other suitable implement by means of which the die may be lifted out of and replaced into the mortar.

The screen 19 is supported in a suitable frame work 39 adapted to slide into the grooved lugs 40 and are held in place by wedges 41, as shown. When the wedges 41 are removed, the screen 19 can be slid forwardly out of alinement with the aperture in the sides of the mortar to give access to the amalgam pockets. Troughs 32 and 33 serve to carry the slime as it passes through the screen toward the front of the machine and to the usual amalgam plates.

The mortar 1 has an upwardly extending frame work 34 to which the feed trough 42 and the hopper 50 are secured in a manner presently to be explained.

The feed trough 42 is of approximately triangular shape and is bounded by walls 43 as shown, the trough 42 is centrally apertured as at 44 and provided with lugs 45 and cross braces 46—47 as shown. The cross braces 47 being apertured as at 48 to receive the reciprocating feed plate 60, hereinafter referred to. At the lower forward end the trough 42 has ears 49 through the medium of which it is secured to the upwardly projecting portion 34 of the mortar 1.

The feed plate 60 has a bridge portion 61 to the rear of which a buffer 62 is secured, while a U-shaped member 63 is secured at the rear of the bridge portion beneath the upper face of the plate 60 to receive the end 64 of the coil spring 65, which has its other end 66 secured to the adjusting rod 67 that passes through the cross block 68 on the supplemental supporting frame 69, which frame 69 is secured to the mortar 1 by the web 70, the bar 71 and the bearing 72 for the bar 71. A turn nut 73 having a handle 74 coöperates with the rod 67 to adjust the tension of the spring 65 for a purpose hereinafter described.

The hopper 50 has its lower edge 51 adapted to fit within the walls 43 of the feed trough and the front of the hopper is secured to the upwardly projecting portion 34 of the mortar frame at the front of the feed trough 42 and above the feed trough 42, a gate 75 is hingedly mounted on a cross bolt 76 carried by the upwardly projecting portion 34 of the mortar frame and the gate 75 is limited in its movement in one direction, by the stops 77 on the projecting frame portion 34.

78 designates a bracket secured to the rear of the beam
68, which carries a buffer 79 to coöperate with the lever 80, which is pivotally mounted at 81 on the beam 68 and has one end provided with an impacting head 82 to coöperate with the buffer 62 on the feed plate 60. The other end of the lever 80 passes through an aperture 84, in one end of a feed plunger 85, which plunger is loosely held on the lever 80 by pins 83, as shown.

The feed plunger 85 projects through an aperture 86 in the sliding block 87 which is slidable in the guide frame 88 carried by the bracket 89 projecting toward the side of the mortar 1 and carried thereby. The block 87 is adjustably held in the guide frame 88 by a feed screw 90, which passes through apertures 91, in the frame 88 and is secured from longitudinal movement by collars 92 and is provided with a hand wheel 93, as shown. By means of the block 87 and its adjusting mechanism, the plunger 85 can be raised or lowered with respect to the frame 88 for a purpose hereinafter described. The plunger 85 has an impacting head 94 at its free end, as shown.

95 designates the main drive shaft of my machine, which is mounted to turn in the bearing boxes 10 and 13 and the shaft 95 carries on its outwardly projecting end a pulley 96 which is keyed to the shaft in any desired manner.

Mounted on the shaft 95 between the sides 5 of the mortar 1, is a pair of disks 97 which are provided with central hubs 98 arranged to be held onto the shaft 95 to rotate in unison, and the hubs 98 are of sufficient length to space the disks 97 apart the required distance.

On the inner face of each disk 97 is formed a series of radially equi-distantly spaced lugs 99, of substantially circular form, which lugs 99 are provided with heels 100 for a purpose hereinafter described. The lugs 99 have apertures 101 and a counter-sunk portion 102 for a purpose now to be explained. 103 designates the hammer members, which in the present form of my invention, comprise the arms 104 and the shoe or head receiving members 105, which project at right angles to the arm 104 a sufficient distance to form a shoulder 106 for a purpose hereinafter described. The hammer head receiving portions 105 have apertures 107 to receive the shanks 29 of the hammer heads or shoes 30 which hammer heads 30 are secured in place by keys 108 so that when the hammer heads 30 are worn out they can be removed and new ones substituted therefor.

The arms 104 of the hammers 103 are provided with hubs 109 which are adapted to seat in the counter-sunk portions 102 of the lugs 99 which portions 102 serve as bearings for the hubs 99 and serve to hold the disks 97 in proper correlative position as well as the bearing spindles or shafts for the hammers to ride on.

Each hammer 103 has the rear end of its arm 104 apertured to receive cross pins 111 and the rear end of each hammer 104 is provided with a lug 112 to strengthen or "back up" the pins 111 to prevent them becoming bent when they engage the heels 100 of the lugs 99 on the disks 97.

Arranged in radial alinement with the apertures 101 are a plurality of apertures 113 in the disks 97 through which bolts 114 pass. Upon the bolts 114 is mounted a series of pendulums 115 of a peculiar form and of a width nearly equal to the width of the space between the plates 97—97 and these pendulums 115 have apertured hubs 116 to receive bolts 114 upon which they are loosely pivoted.

The pendulums 115 have heels 117 which engage the hammers 103 at times to counter-balance the same, while they also have cam portions 118 to engage the hubs 98 of the disks 97, while the heels 117 are in engagement with the hammers. The pendulums 115 also have arms 119 for coöperating with the hammers when in certain positions to modify the action of the hammers. The radius of the path of the pendulum is not sufficient so that centrifugal force will throw them out, and there is no action of the pendulums on the particular hammer which is engaged on the striking operation, and the pendulums are so arranged as to aid the hammers in distributing an even pressure on the material that is being ground against the die, they serving to add to the pressure of the hammers in proportion as the pressure of the hammers is decreased during the corresponding change in their angularity.

The mortar 1, in the form of my invention shown in Figs. 1, 2 and 3, is preferably constructed of cast iron and cast in one piece.

I may, in practice, find it desirable to construct the mortar 1 of wood, out of a single piece of timber, and, in that event, the mortar will assume the shape shown in Figs. 16 and 17, of the drawings, and when this form of mortar is used, I place a pair of plunger collars 120 on the main shaft 95 to abut the sides of the mortar.

121 designates a collar secured on the projecting end of the shaft 95, opposite to that carrying the drive pulley 96, which collar 121 has a plurality of radial arms 122 spaced equi-distantly apart, and equal in number to the number of hammers carried by the disks 97 and the arms 122 are adapted to strike the end 94 of the plunger 85 to cause motion to be imparted thereto, which motion is imparted to the sliding plate 60, to reciprocate the same to cause the plate 60 to carry the contents from the hopper down under the gate 75, which gate 75, on the return movement of the plate 60, wipes the ore off the plate 60 onto the anvil portion 27ᵃ of the die 25, and by reason of the correlative arrangement of the arms 122 and the plunger 85, such ore will be deposited on the anvil 27ᵃ, just in advance of the time when the hammer head comes down onto the anvil 27ᵃ, thus thoroughly crushing the ore which then falls down, onto the body portion of the die 26, and is pulverized by the hammers as they carry the ore along. The collar 121 can be screwed on the shaft 95 by a set screw, if desired, so that its proper position on the shaft 95 can be obtained.

The hammer shoes are made of very hard steel so that their shanks are of considerable value. To utilize this otherwise waste material, I construct the hammer heads or shoes and hammers as shown, so that the hammer shoes, when worn can be removed and the worn out portion of the shoes, can be placed in the amalgam pockets, as before described. The thickness of the die is nearly equal to the length of a hammer head or shoe stem, and by having the apertures in the dies, and inserting the stems up through these apertures, and providing a suitable seat, (the amalgam pockets in the bottom of the mortar) for the protuberant heads of the shoes in the bottom of the mortar, the mill-man is enabled to make use of his old heads or hammer shoes, even after they have served their original purpose. The shoes or hammer heads, as before stated, are very hard and the weight supplied by their stems is that much weight saved on the dies.

The die can be made in sections, as shown in my patent hereinbefore referred to, if desired.

Having thus described the construction of my present invention, the manner in which it operates will be best explained as follows.

*Operation.*—The ore is placed in the hopper 50 and motion is imparted to the drive shaft 95 in the direction of the arrow in Fig. 3, thus rotating the disks 97 and their carried parts, in the direction indicated by the arrow just referred to. As the disks 97 and their carried parts (forming the crushing and grinding mechanism) rotate in the direction indicated, the arms 122 will engage the plunger 85 and cause it, through the medium of the lever 80 to operate the reciprocating feed plate 60, to cause the material to be pushed downward toward the anvil portion 27ᵃ of the die 26 onto which it is deposited as the feed plate 60 starts on its return movement, by reason of the pivoted gate 75 in a manner similar to that in my patent hereinbefore referred to. Just after the material has been dumped onto the anvil portion 27ᵃ of the die 26, one of the hammers 103, strikes such material, and crushes the same. The material then finds its way down on the curved face of the die where it is pulverized by the further action of the hammers, in a manner similar to that in my patent hereinbefore referred to. As the disks 97 and their carried parts rotate, the centrifugal force of the grinding hammers is augmented by the weight of the pendulums 115, which are so arranged that their weight counter-balances the weight of the hammers when the hammers are out of engagement with the die, the pendulums 115 being so arranged that their cam portion 118 will hold the same out of engagement with the hammer when it is in its striking position.

In my patent before referred to, I have found that by constructing the machine in accordance therewith, in practice, it requires too much power to operate the machine, while by using the pendulums of my present invention, and arranging them as shown and described, the weight of the pendulums serve to counter-balance to a large extent, the weight of the hammers, so that in a machine constructed in accordance with my present invention, only about one-fourth the power is required to operate the machine, while the capacity is much greater than in the machine disclosed in my patent before referred to. The pendulums assist the hammers to throw out at a lower rate of speed than the ring of my patent before referred to, and fall away from the hammers while the hammers are grinding, and add little or no pressure thereto.

The amalgam pockets are filled with mercury when the machine is started, and water is introduced into the machine through the apertures 12 in the upper bearing boxes, which serve not alone to form the crushed material into pulp, but also serve to wash out the bearings and prevent any possible dirt or grit to form therein, and hence enables a smoother running of the machine than would be otherwise possible. The precious metals in the pulp will be largely amalgamated in the amalgam pockets, while those that pass out through the screens 19 can be amalgamated on the usual amalgam plates.

The mill can also be used as a dry mill as well as a wet mill, if desired, and by constructing the hammers with shoulders 106, when the heads 30 wear down completely, there will be still sufficient discharge to draw the material around even when the head or shoe 30 is worn out, thus greatly increasing the capacity of the mill.

By constructing the adjusting mechanism for the plunger 85, I am enabled to adjust the plunger into the proper correlative arrangement with the arms 122 to enable the proper stroke to be given to the feed plate 60.

The number of arms on the collar 121 can be varied according to the ore to be operated upon.

For small mills, the mortar may be made of a single piece of wood, as shown in Figs. 16 and 17, whereas in large mills it is made of cast metal. The screens may be placed at any angle desired and the die may be cast in sections, as shown in my patent before referred to, for convenience of transportation over difficult roads.

125 designates a cover for the mortar 1, which is made preferably of sheet metal reinforced by the angle irons 126, as shown, and this cover is pivotally mounted at 127 to the mortar frame, as shown.

From the foregoing description, taken in connection with the accompanying drawings, it is thought the complete construction, operation and many advantages of my invention will be readily apparent to those skilled in the art to which it appertains.

What I claim is:—

1. A quartz mill, comprising a mortar, a rotatable shaft, a series of hammers carried thereby and a series of normally separated devices for coöperating with said hammers to regulate their crushing and grinding action, substantially as shown and described.

2. A quartz mill, comprising a mortar, a rotatable shaft, a series of hammers carried thereby, normally separated means coöperating with each hammer for counterbalancing said hammers when in their non-operative position substantially as shown and described.

3. A quartz mill, comprising a mortar, a rotatable shaft, a series of hammers carried thereby, means carried by the shaft and coöperating with each hammer, for counter-balancing the same when in its non-operative position, and then regulating the centrifugal force of said hammers at times, substantially as shown and described.

4. A quartz mill, comprising a mortar, a rotatable shaft, a series of hammers carried thereby, a series of pendulums also carried by said shaft for coöperating with said hammers, substantially as shown and described.

5. In a quartz mill, the combination with the rotatable support, a series of pivotal hammers hung thereon, of a die having an anvil formed on the receiving end thereof and projected into the range of action of the striking face of the hammers, means whereby the hammers after striking said anvil turn upon their pivots and travel over the remaining surfaces of the die, independent means for each hammer carried by the rotatable support, for regulating at times, the centrifugal force of the hammers, and for counter-balancing the weight of said hammers at times, said independent means being arranged to be out of engagement with the hammer when in its striking position, and means for feeding ore upon the anvil.

6. In an apparatus of the class described, comprising in combination, a mortar, a die held in said mortar, and having an anvil face, a drive shaft adjustably held in said mortar, a series of pivotally mounted hammers carried by said drive shaft and a series of pivotally mounted pendulums also carried by said drive shaft for coöperating with said hammers, and means for feeding ore onto the anvil, substantially as shown and described.

7. A quartz mill, comprising a mortar having a concaved working face, a rotatable shaft, a series of hammers carried thereby, a series of pendulums also carried by the shaft for coöperating with the hammers, and means for feeding ore to said anvil.

8. In an apparatus of the class described, a pounding and grinding mechanism comprising a rotatable shaft, a pair of disks parallelly arranged on said shaft, and spaced apart, a plurality of hammers pivotally supported between said disks in radial alinement with the shaft, a plurality of pendulums, one for each hammer, pivotally mounted between said disks, a plurality of lugs carried by said disks and ears carried by said hammers for engaging said lugs, substantially as shown and described.

9. In an apparatus of the class described, a mortar having a concaved working face, a die held therein, said die having an anvil portion, said mortar having a plurality of amalgam pockets, interlocking means between said die and said mortar, means for intermittently feeding ore to said die anvil portion, a rotatable shaft, a series of hammers pivotally carried thereby adapted to strike said anvil portion and be carried around in engagement with the concaved face of the die, means for limiting the pivotal movement of said hammers, and independent means for each hammer for coöperating therewith to counter-balance the same when in one position, to regulate the weight of the hammers as their angularity decreases and to remain out of contact with said hammers when in their striking positions, substantially as shown and described.

10. In a quartz mill, the combination of a mortar having amalgam pockets, a die having lugs to enter said pockets, one end of said die forming an anvil, a shaft mounted over said mortar, and hammers carried by said shaft and adapted to coact with the anvil, substantially as shown and described.

11. In a quartz mill, the combination of a mortar having amalgam pockets, a die having lugs to enter such pockets, one end of said die forming an anvil, a shaft mounted over said mortar, hammers carried by said shaft and adapted to coact with the anvil, and independent means coöperating with each hammer for regulating the centrifugal force thereof, substantially as shown and described.

12. In a quartz mill, the combination with the mortar having side openings, screens detachably secured over said openings, troughs for said mortar, outside of said screens, said mortar being provided with a series of pockets, a die mounted in said mortar, a rotatable shaft mounted above said die and a plurality of hammers carried by said shaft for coöperating with said die, substantially as shown and described.

13. In a mill, the combination with a mortar, a rotary hammer support and hammers pivoted thereon, said hammers having their ends provided with stops, stops on said hammer support for coöperating with the hammer stops to limit the movement of the hammers about their pivots, means for feeding ore to said mortar, said means including a feed chute, a reciprocating ore carrier, and means for moving said carrier coördinate with said hammers, and means for adjusting said moving means, substantially as shown and described.

14. In a quartz mill, the combination with a rotatable support, of a plurality of hammers pivoted thereon, said hammers comprising arms terminating in head receiving portions, said head receiving portions being apertured, detachable heads secure to said head receiving portions and having shanks for entering the apertures thereof, said hammer arms being provided with shoulders at the ends thereof, pins passing through said ends adjacent said shoulders, and means on the rotatable member for coöperating with said pins to limit the pivotal motion of the hammers substantially as shown and described.

15. In a mill of the character described, a mortar having a concaved portion, a die held in said concaved portion, said die having an anvil end and a grinding surface, a shaft rotatably mounted above said die, means for adjusting said shaft toward or from said die, a plurality of pivotally mounted hammers carried by said shaft, means for limiting the pivotal motion of said hammers, independent means coöperating with each hammer for counterbalancing the centrifugal force thereof, a hopper and a feed trough, a reciprocating plate for said feed trough, means controlled by the rotation of said shaft for reciprocating said feed plate, said last named means including a reciprocating plunger, means for adjusting said plunger with respect to said shaft, and means for admitting water into the interior of the mortar through the bearings of the shaft, substantially as shown and described.

16. A hammer for quartz mills, comprising a head receiving portion, an arm projecting at right angles thereto, said hammer having a shoulder at the juncture of the head receiving portion with the arm, a detachable head or shoe detachably secured to said hammer head receiving portion, said hammer arms having a pair of apertured projecting bearing lugs and a heel, said heel being provided with a pair of shoulders and a pin receiving aperture, and a pin passing through said pin receiving aperture, substantially as shown and described.

17. In an apparatus of the class described, the combination with the mortar, and a die having an anvil portion and a grinding face, of a rotatable shaft supported above said die, a pair of disks mounted on and carried by said shaft, a plurality of hammers pivotally mounted between said disks, means for limiting the pivotal movement of said hammers, independent means coöperating with each hammer for controlling the centrifugal force thereof, substantially as shown and described.

18. An apparatus of the class described, comprising a mortar having a concaved portion, amalgam pockets in the bottom and side walls of said concaved portion, outlet apertures in the side walls of said mortar, screens detachably held over said outlet apertures, a die held in said concaved portion of said mortar, and said die having an anvil portion and a grinding surface, said mortar having bearing receiving brackets, upper and lower bearing boxes held on said brackets, a shaft rotatably mounted in said bearing boxes, a plurality of hammers carried by said shaft for coöperating with said die, means for admitting water into the interior of the mortar through the bearing boxes, and means for feeding ore into the entrant end of the mortar substantially as shown and described.

19. An apparatus of the class described, comprising a mortar having a concaved portion, amalgam pockets in the bottom and side walls of said concaved portion, an outlet apertures in the side walls of said mortar, screens detachably held over said outlet apertures, a die held in said concaved portion of said mortar, and said die having an anvil portion and a grinding surface, said mortar having bearing receiving brackets, upper and lower bearing boxes held on said brackets, a shaft rotatably mounted in said bearing boxes, a plurality of hammers, carried by said shaft for coöperating with said die, means for admitting water into the interior of the mortar, through the bearing boxes, means for feeding ore into the entrant end of the mortar, and means interposed between the lower bearing boxes and the brackets for spacing the shaft at a greater or less distance from the die, substantially as shown and described.

20. In an apparatus of the class described, the combination with a mortar, a crushing and grinding mechanism therefor, of feed mechanism comprising a feed trough secured to the entrant end of the mortar, a hopper secured above the feed trough to discharge therein, a feed plate carried by the feed trough for moving the ore toward the mortar, a pivoted gate at the entrant end of the mortar for coöperating with said feed plate, said feed plate having a raised portion, a coil spring held in said raised portion, and connected thereto, an adjusting screw connected to the other end of said coil spring and passing through the frame of the machine, an adjusting nut on said screw for adjusting the tension of said coil spring and means controlled by the crushing and grinding mechanism for moving said feed plate in one direction, substantially as shown and described.

21. In an apparatus of the class described, the combination with a mortar, a crushing and grinding mechanism therefor, of feed mechanism comprising a feed trough, secured to the entrant end of the mortar, a hopper secured above the feed trough to discharge therein, a feed plate carried by the feed trough for moving the ore toward the mortar, a pivoted gate at the entrant end of the mortar for coöperating with said feed plate, said feed plate having a raised portion, a coil spring held in said raised portion and connected at one end thereto, an adjusting screw connected to the other end of said coil spring and passing through the frame of the machine, an adjusting nut on said screw for adjusting the tension of said coil spring, means controlled by the crushing and grinding mechanism for moving said feed plate in one direction, said last named means comprising a pivoted lever having one end adapted to abut the feed plate, a plunger secured to the other end of said lever, and means carried by the operating shaft of the crushing and grinding mechanism for reciprocating said plunger, and a buffer for retarding the rebound of said lever, substantially as shown and described.

22. In an apparatus of the class described, the combination with a mortar, rotatable crushing and grinding mechanism carried thereby, and including a rotatable drive shaft, of feeding mechanism for feeding ore to said mortar, comprising a hopper, a feed trough thereunder in connection with the entrant end of the mortar, a reciprocable feed plate carried by the trough, a pivot lever for reciprocating said feed plate, a plunger connected with said lever and projected downwardly toward the shaft, a plurality of radial arms carried by the shaft for engaging said plunger to reciprocate the same, an adjusting block through which said plunger passes, an elongated bearing member carried by the mortar for receiving said adjusting block, and a screw passing through said bearing member and adjusting block for moving the bearing member to adjust the plunger, substantially as shown and described.

CHARLES E. HUMPHREYS.

Witnesses:
H. J. BARTON,
GEO. C. BONBRIGHT.